United States Patent [19]

Smither

[11] 4,429,411

[45] Jan. 31, 1984

[54] INSTRUMENT AND METHOD FOR FOCUSING X-RAYS, GAMMA RAYS AND NEUTRONS

[75] Inventor: Robert K. Smither, Hinsdale, Ill.

[73] Assignee: The United States of America as represented by the United States Department of Energy, Washington, D.C.

[21] Appl. No.: 362,172

[22] Filed: Mar. 25, 1982

Related U.S. Application Data

[63] Continuation-in-part of Ser. No. 255,974, Apr. 20, 1981, abandoned.

[51] Int. Cl.³ .......... G01N 23/20

[52] U.S. Cl. .......... 378/84; 378/145

[58] Field of Search .......... 378/82, 84, 85, 43, 378/145

[56] References Cited

U.S. PATENT DOCUMENTS

| | | | |
|---|---|---|---|
| 3,143,651 | 8/1964 | Giacconi | 378/43 |
| 3,376,415 | 4/1968 | Krogstad | 378/84 |
| 3,777,156 | 12/1973 | Hammond | 378/84 |
| 3,980,883 | 9/1976 | Franks | 378/84 |
| 3,991,309 | 11/1976 | Hauer | 378/145 |
| 4,132,654 | 1/1979 | Braun | 378/145 |
| 4,192,994 | 3/1980 | Kastner | 378/84 |

*Primary Examiner*—Craig E. Church
*Attorney, Agent, or Firm*—William Bohff; Bruce R. Mansfield; Richard G. Besha

[57] ABSTRACT

A crystal diffraction instrument or diffraction grating instrument with an improved crystalline structure or grating spacing structure having a face for receiving a beam of photons or neutrons and diffraction planar spacing or grating spacing along that face with the spacing increasing progressively along the face to provide a decreasing Bragg diffraction angle for a monochromatic radiation and thereby increasing the usable area and acceptance angle. The increased planar spacing for the diffraction crystal is provided by the use of a temperature differential across the crystalline structure, by assembling a plurality of crystalline structures with different compositions, by an individual crystalline structure with a varying composition and thereby a changing planar spacing along its face, and by combinations of these techniques. The increased diffraction grating element spacing is generated during the fabrication of the diffraction grating by controlling the cutting tool that is cutting the grooves or controlling the laser beam, electron beam or ion beam that is exposing the resist layer, etc. It is also possible to vary this variation in grating spacing by applying a thermal gradient to the diffraction grating in much the same manner as is done in the crystal diffraction case.

23 Claims, 19 Drawing Figures

FIG 8
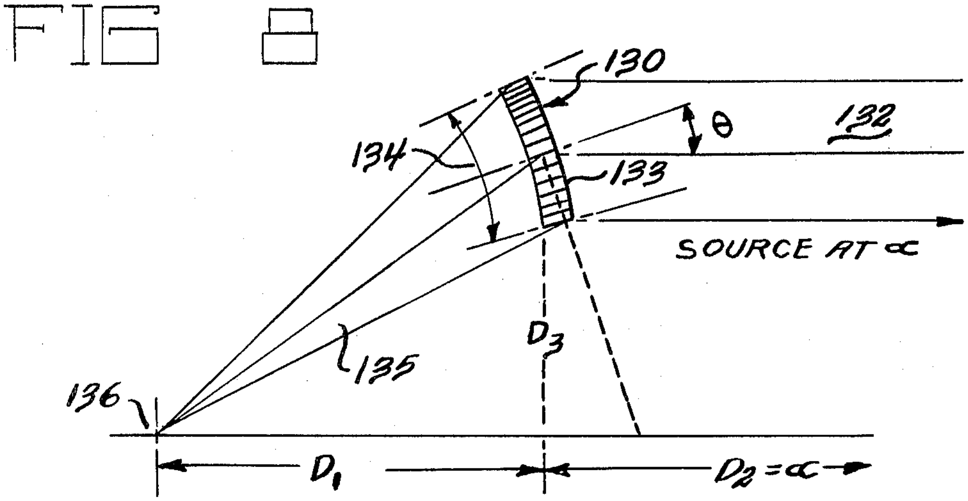
FIG 9
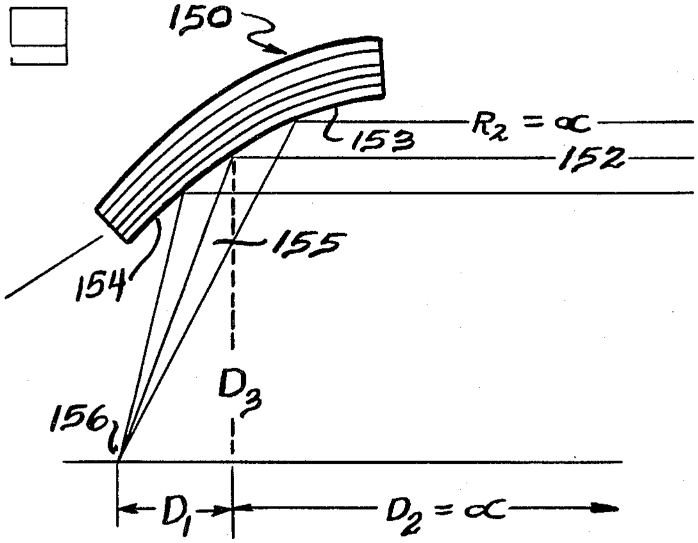
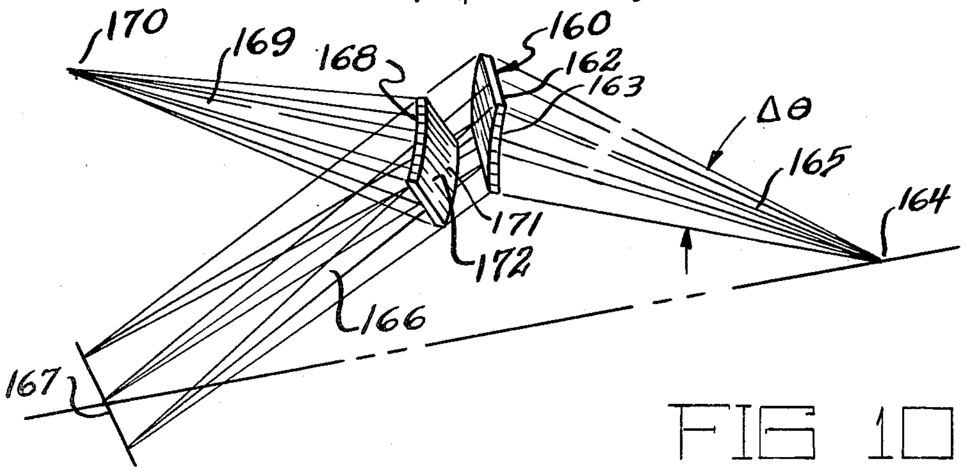
FIG 10

INSTRUMENT AND METHOD FOR FOCUSING X-RAYS, GAMMA RAYS AND NEUTRONS

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

This in a continuation-in-part of U.S. application Ser. No. 255,974 filed Apr. 20, 1981, now abandoned.

BACKGROUND OF THE INVENTION

This invention relates to diffraction by the use of periodic structures such as crystals, gratings and the like and more particularly to an instrument for diffraction in which the spacing associated with the crystalline planar or grating elements in the periodic structure is progressively increased or decreased along a face or direction of the structure to progressively change the Bragg diffraction angle, and to a method of providing a controlled and progressive change in the Bragg angle along a face or direction of the structure associated with diffraction spacing to increase the usable diffraction area or acceptance angle of the structure for monochromatic radiation and thereby improve the extent that beams of photons and particles may be focused or otherwise controlled.

The diffraction of photons such as x-rays and gamma rays by crystals is an old and well established discipline. Crystal diffraction may generally be divided into two classes, the "transmission" type and the "surface diffraction or reflection" type. In the transmission type as illustrated in the schematic diagram of FIG. 1*a*, the crystal planes used in the diffraction process are perpendicular to the face or incident surface of the crystal and the beam of photons pass through crystal. In the "surface diffraction or reflection" type as illustrated in the schematic diagram of FIG. 1*b*, the crystal diffraction planes are parallel to the face or incident surface of the crystal and the beam of photons are diffracted near this surface so that they merge from the same face of crystal that they entered. The transmission type diffraction is used mainly for high energy photons with their corresponding small Bragg angles while the surface type diffraction is more useful with lower energy photons with their larger Bragg angles and higher absorption coefficients.

Early diffraction instruments such as the spectrometer used flat crystals and had efficiencies as low as $10^{-9}$ diffracted photons per source photon. The low efficiency occurred because only a very thin slice of the crystal satisfied the Bragg condition for the diffraction based on the Bragg equation $$n\lambda = 2d \sin \theta$$

where "n" is the order of diffraction, "λ" is the wavelength of the photons, "d" is the crystalline plane spacing, and "θ" is the Bragg angle or incident angle. If the beam of photons entered the crystal at an angle other than the Bragg angle, reflection at that portion of the beam was essentially eliminated. For purposes of illustration, the usable narrow slice of a crystal may be only about 0.001 cm for a high quality crystal with a rocking curve of about 2 seconds and with a source at a distance of about 100 cm.

Some of the important features of crystal diffraction instruments relate to the extent that the beam of photons (i.e., x-rays and gamma rays) or particles (i.e., neutrons) may be diffracted with a reasonable efficiency and focused or otherwise controlled to provide an image of desired intensity. Since the usable area or acceptance angle of flat crystals is extremely limited, it has become necessary to bend crystals to improve the area or acceptance angle over which the Bragg condition was satisfied to improve the efficiency and intensity levels of the diffracted beam. The schematic diagrams of FIGS. 2*a* and 2*b* provide illustrations of bent crystals used for the transmission and reflection type of crystal diffraction. While the use of bent crystals improved efficiencies, intensities, and focusing operations of the crystal diffraction instruments over those for instruments using flat crystals, it was not always possible to easily bend crystals to the desired extent and some crystals such as those of bismuch and tin would tend to break before being bent beyond a limited extent.

Further, the crystal diffraction instruments with bent crystals had disadvantages. As illustrated in the schematic diagram of FIG. 2*a* with the transmission type, it was necessary to use a broad source to provide a concentration of monochromatic radiation at a line image. With the reflection type, as illustrated in the schematic diagram of Fig 2*b*, it was possible to form a focused line image from a point source although the distances of the image and source usually were equidistant from a center line.

Focusing is of considerable importance to instruments using crystal diffraction since accurate detection and measurement of diffracted beams often are dependent on the intensity of the diffracted beam and the extent that the beam is focused within a small area. As illustrated in FIGS. 1*a* and 1*b* for beams which are not effectively focused, the target or image area must be increased for effective detection or measurement.

Focusing of parallel rays is also of importance. In the telescope in the Einstein satellite which has been in orbit around the earth, total reflecting mirrors are used to focus parallel beams of x-rays and gamma rays from deep space. Limitations in the performance of the reflecting mirror system limited the usable photon energies for this satellite telescope to about 5 KeV and below with more satisfactory performance being at about 2-3 KeV. Increase in the usable photon energies to values above about 5 KeV would be desirable. Replacement of the mirror system with crystal diffraction systems in the present state of the art would not solve these problems since they do not effectively focus parallel rays, even those of low photon energies. Therefore, new crystal diffraction systems with improved performance in focusing or converging parallel rays at higher photon energies would be desirable for satellite telescopes and other instruments.

In a similar manner, diffraction gratings have become important for the focusing and imaging of soft x-rays, ultraviolet, visible and infrared radiation. The basic difference in these methods for focusing is that diffraction occurs in the grating by a two dimensional phenomena while it is three dimensional in the crystalline structure. Diffraction gratings are conventionally made by photographic techniques to produce a series of parallel lines in the film and by etching or machining of conductive metals to produce a similar pattern in the metal surfaces.

Since gratings have conventionally been made with the diffraction spacing being essentially constant, the effectiveness of these gratings has been limited for much the same reasons that were discussed above for the crystal diffraction case. The constant diffraction element spacing results in a constant diffraction angle for the diffracted beam. This makes it impossible to convert a parallel beam into a convergent beam and/or to use the diffraction process as a method for focusing radiation from any type of source except in the very special case of the reflection type diffraction grating used in the zero order ($\theta_1=\theta_2$) where no spectral discrimination occurs.

One of the objects of this invention is to provide a means of increasing the area or acceptance angle in periodic structures used for crystal diffraction and in grating diffraction. Another object is to increase the efficiency of the diffraction process. An additional object is to improve the intensity of the diffraction process. A further object is to improve focusing in instruments utilizing crystal diffraction or diffraction by gratings. Yet another object is to provide means for focusing of parallel beams. It is also an object to increase the energy levels to values above 5 KeV for focused beams which may be diffracted by diffraction instruments. These and other objects will become apparent from the following description.

SUMMARY OF THE INVENTION

In this invention, the performance of a crystal or of a grating for diffraction is improved by providing a progressive change in the atomic planar spacing along the face of the structure. With respect to the use of a crystal and to the progressive change in spacing, the value of "d" in the Bragg equation is changed resulting in a progressive change in the Bragg angle along the crystalline face. By the change in Bragg angle, a greater area or acceptance angle of the crystal may be utilized resulting in improved efficiency, intensity and focusing of a beam of photons or particles. In addition, parallel beams may be focused or otherwise converged or diverged in a controlled manner. Another advantage is that crystals composed of materials of higher atomic number may be utilized for diffracting beams of energy levels above 5 KeV to values of 100 KeV and above. Accordingly, the invention is directed to a crystal diffraction instrument in which the means for diffracting a beam of photons or particles includes a periodic structure with a face having a length and periodic diffraction surfaces spaced along that length with the spacing changing progressively along the length. The progressive change in spacing provides a progressive change in the Bragg angle and thereby increases the usable area for the photon beam. The change in Bragg angle for crystal diffraction and thus the increase in efficiency of the instrument such as the spectrometer can be obtained from the equation $$\Delta d/d = \cot\theta\,\Delta\theta$$

where $\Delta d$ is the change in the planar spacing and $\Delta\theta$ is the change in the Bragg angle over the usable face of the crystal. For a value of $\Delta d/d$ equal to $2.7\times10^{-3}$ and the Bragg angle $\theta$ equal to 20°, then the change in the Bragg angle ($\Delta\theta$) under these representative conditions is equal to about $10^{-3}$ radians or 200 seconds of arc. This may be compared to about two seconds of arc for the rocking curve or acceptance angle of a good crystal of the prior art resulting in an improvement of about 100. It is evident from the geometries of FIG. 3 that the acceptance angle for a crystalline structure with a change in planar spacing is essentially equal to the change in the Bragg angle. It is further evident that the usable area is determined by the distance from the source of a diverging beam but is essentially proportional to the acceptance angle.

For the bent crystals utilizing the invention, there is an interdependence between the radius of curvature ($R_c$) and change in spacing ($\Delta d$) for the transmission and reflection types of crystal diffraction as indicated by the following equations:

(transmission type)

$$R_c = 2R_1R_2/\cos\theta\,(R_2 - R_1)$$

$$\frac{\Delta d}{d} = \frac{-\cos^2\theta}{2\sin\theta}\,\frac{(R_2 + R_1)}{R_2R_1}\,\Delta l$$

(reflection type)

$$R_c = 2R_1R_2/\sin\theta\,(R_2 - R_1)$$

$$\frac{\Delta d}{d} = \frac{-\cos\theta}{2}\,\frac{(R_2 + R_1)}{R_2R_1}\,\Delta l$$

where "$R_1$" equals the distance from the image to the crystalline structure, "$R_2$" equals the distance from the source to the crystals, and "$\Delta l$" is the distance along the surface of the crystal.

With respect to the use of gratings, the basic concept is to vary the distance between and the width of the scattering lines, slits, or grooves in the diffraction grating in such a way so that the diffraction angle for monochromatic radiation changes with the position on the surface of the diffraction gratings so that the desired focusing and/or imaging occurs.

The basic difference between diffraction by crystalline structure or gratings is that the diffraction grating represents essentially a two-dimensional diffracting medium while the diffraction crystal is a three-dimensional diffracting medium. Further, in the diffraction grating, the spacing between periodic spaced diffracting elements can be made almost any value down to a practical limit of a few microns and is substantially under the control of the manufacturer while in the crystal diffractor case, the spacings are controlled by the electronic forces between atoms and are therefore much more restricted in what these spacings can be and how fast they can change with position in the crystal. This new freedom in the control of the spacing permits the manufacture of diffraction systems with much shorter focal lengths than in the diffraction crystal case and that are usable over much longer ranges of wavelengths.

The general development of the mathematics is much the same as previously explained for the crystalline structures, where the Bragg diffraction angle $\theta$ was given by the relation $n\lambda=2d\sin\theta$ where $\theta$ was both the incident and exit angle relative to the crystalline planes for both types of diffraction as shown in FIGS. 1*a* and 1*b*. The diffraction grating is based on (a) the relationship $n\lambda=d(\sin\theta_1+\sin\theta_2)$ for the transmission case and the reflection case of the first kind (both illustrated in FIG. 12(*a*) and (*b*) the relationship and $n\lambda=d(\sin\theta_1-\sin\theta_2)$ for the reflection case of the second kind (as illustrated in FIG. 12*b*). For the transmission case when $\theta_1=\theta_2$ then essentially all the mathematics that apply to the crystal diffraction examples in general apply to the diffraction gratings so essentially all the solutions that have been described previously apply. The case of $\theta_1=\theta_2$ in the reflection case is wavelength independent so the diffraction grating acts like a plane mirror for "zero order diffraction". However, one of the advantages with diffraction gratings is that $\theta_1$ does not have to equal $\theta_2$ and the respective distances to the source and to the image need not be equal. Further with the limitation that the basic equation is satisfied, a family of solutions and thereby images is possible. With beams of energy of mixed frequencies, the gratings may be used as selective filters in addition to diffracting with the multiple images being associated with individual frequencies or wavelengths. Since diffraction gratings in such structure as film may be easily formed into curves and other shapes, new configurations for the focusing and imaging systems are also possible (as illustrated in FIGS. 14 and 15).

For focusing a monochromatic point source of light to a line image as illustrated in FIG. 12*a*, the methamtics may be set forth as follows:

$$n\lambda = d\,(\sin\theta_1 + \sin\theta_2)$$

$$d = \frac{n\lambda}{(\sin\theta_1 + \sin\theta_2)}$$

$$\sin\theta_1 = \frac{\chi}{R_1} \quad \frac{\chi}{(\chi^2 + D_1^2)^{\frac{1}{2}}} \quad \sin\theta_2 = \frac{\chi}{R_2} = \frac{\chi}{(\chi^2 + D_1^2)^{\frac{1}{2}}}$$

$$d = \frac{n\lambda}{\chi}\left[\frac{(\chi^2 + D_1^2)^{\frac{1}{2}}\,(\chi^2 + D_1^2)^{\frac{1}{2}}}{(\chi^2 + D_1^2)^{\frac{1}{2}} + (\chi^2 + D_2^2)^{\frac{1}{2}}}\right]$$

where "n" is the order of diffraction, "λ" is the wavelength, "d" is the spacing between the diffraction elements, "$\theta_1$" is the Bragg angle for the original beam, "$\theta_2$" is the Bragg angle for the diffracted beam, "$D_1$" is the distance from the source to the grating, and "$D_2$" is the distance from the grating to an image. If $\theta_1=\theta_2$, the $d=n\lambda/2\sin\theta_1$ and the change in d as a function of $\theta$ is given by $$\frac{\Delta d}{d} = \cot\theta\Delta\theta.$$

In the more general case where $\theta_1\neq\theta_2$, $d=n\lambda/(\sin\theta_1+\sin\theta_2)$ $$\frac{\Delta d}{d} = -\frac{(\cos\theta_1\Delta\theta_1 + \cos\theta_2\Delta\theta_2)}{\sin\theta_1 + \sin\theta_2}$$

$$\frac{\Delta d}{d} = \frac{\frac{\Delta\chi}{\chi}\ \frac{R_1}{R_2}\left[\frac{D_1^2}{R_1} + \frac{D_2^2}{R_2}\right]}{R_1 + R_2}.$$

In addition to the diffraction structure as described herein, the invention is directed to a method of conducting diffraction with respect to a beam which comprises the steps of (1) providing a periodic structure with a face having a length with a diffraction spacing between diffraction surfaces along that length increasing progressively to thereby provide an increased area satisfying the Bragg condition for the beam, (2) directing the beam to the periodic structure and (3) receiving the diffracted beam. By the invention, the acceptance area or angle of a periodic structure which satisfies the Bragg condition may be increased. In addition, increased efficiencies and intensities may be obtained from these structures used for diffraction. Further, improved focusing and the focusing of parallel beams may also be obtained.

BRIEF DESCRIPTION OF THE DRAWINGS

FIG. 8 is a sixth embodiment of the invention showing a transmission type of crystal diffraction where the crystal is bent and the incident beam consists of parallel rays.

FIG. 9 is a seventh embodiment of the invention showing a reflection type of crystal diffraction where the crystal is bent and the incident beam consists of parallel rays.

FIG. 10 is an eighth embodiment of the invention showing a transmission type of crystal diffraction where the two bent crystals are used to focus the beam from a point source to form a point image.

DETAILED DESCRIPTION OF THE INVENTION

Figure 1A:
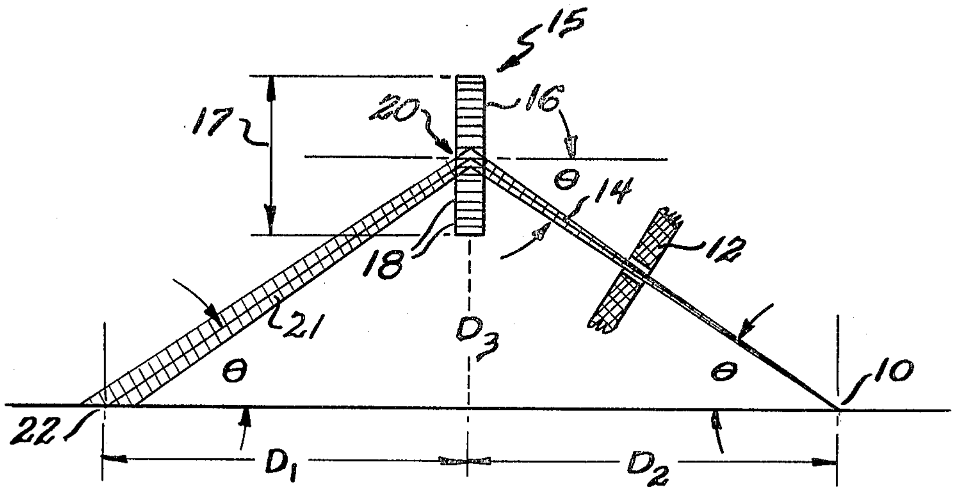
FIG 1A (PRIOR ART)
FIG. 1*a* is a schematic representation of the transmission type of crystal diffraction of the prior art with a flat crystal and a point or line source.

As described previously, the invention is directed to a diffraction instrument in which the means for diffracting a beam of photons or particles includes a periodic structure with diffraction planes or elements being spaced in a periodic pattern along a length of the face, with the spacing changing progressively along the length to provide a change in Bragg angle along that length. The invention further relates to the diffraction means with the progressively changed spacing and to a method of providing the diffraction means. Advantageously, the periodic structures include crystalline structures and diffraction gratings.

With respect to crystal diffraction, the invention includes an instrument for crystal diffraction and a method of conducting crystal diffraction under conditions which satisfy the Bragg condition based on the Bragg equation as described above. With respect to diffraction by gratings, the invention includes an instrument for diffraction by the use of gratings and to a method of constructing a grating with improved performance.

As is known with respect to crystal diffraction, the Bragg condition also includes the relationship that the incident angle is equal to the angle of reflection in the crystalline structure. In an instrument for diffracting a beam of energy using means for diffracting the beam, the improvement comprises a crystalline structure with a face having a length and diffraction plane spacing along the length with the spacing changing progressively along the length in a direction parallel to the face to provide a Bragg angle of decreasing values with respect to a particular monochromatic radiation frequency (wavelength).

Instruments of this type include spectrometers, medical devices used to focus or increase the intensity of a beam for treatment purposes, satellite telescopes used for focusing parallel beams of photons such as x-rays and gamma rays from deep space, and devices useful for research purposes where beams of photons or particles are directed against samples to determine particular characteristics of the samples. Usually these instruments include means for receiving the diffracted beam on a target area for providing an image and in many instances include an aperture or other means for admitting the beam from the source to the diffracting means. In a spectrometer, the means for receiving the beam include the exit or detector slit while the entrance aperture may represent the means admitting the beam. One or more collimators may also be used to separate the diffracted beam from the undiffracted beam as is customary in this art. In addition, sections of the inventive instrument may be movable to adjust to different portions of the admitted beam. For a satellite telescope, means are provided for admitting a parallel beam of photons from deep space and for focusing the diffracted beam.

In the inventive method for the crystalline structure, the steps include (1) providing a crystalline structure with planar spacing along a length of a face of the structure where the spacing progressively changes in value, (2) directing a beam of elemental photons and/or particles to the face of the crystalline structure to provide a diffracted beam, and (3) receiving the diffracted beam. The first step may be carried out by providing a temperature differential or gradient along the length of the crystalline structure to progressively change by a positive or negative value, the planar spacing by utilizing the thermal coefficient of expansion; or contraction; by providing a spatial arrangement of two or more different crystalline structures to form a length with different planar spacing; by providing a change in composition along a length of a crystalline structure to provide a progressive change in planar spacing, or by combinations of these techniques. Advantageously, the crystalline structure with changed planar spacing is provided by the use of a temperature gradient or a change in crystalline composition and preferably by a temperature gradient of at least about 50° C./cm in length.

Suitable crystalline structures include crystals with an elevated melting point of at least about 200° C., and preferably above about 500° C., and other characteristics of atomic number and magnetic properties dependent on the particular beam of interest. For lower energy beams, crystals of lower atomic number are desired with the reverse being the guideline for higher energy beams. For beams of neutrons, crystals with some magnetic properties are desired. In general, suitable crystals include those of quartz, calcite, silicon, germanium, gold, tin, nickel, graphite, beryllium, copper, zinc, sapphire, diamond, and the like. Combinations of separate crystals of silicon and nickel, nickel and germanium, germanium and tin, silicon and germanium, silicon and tin, and the like, may be used. For crystalline structures with changing compositions, combinations of crystals of nickel with about 20 at. % of germanium, silicon or tin or of cadmium with about 30 at. % of silver may be used. Characteristics of these crystals with respect to composition and planar spacing are in such references as "A Handbook of Lattice Spacings and Structures of Metals and Alloys" by W. B. Pearsons, Pergamon Press, London (1958 and 1967), Vol. I, pp. 286, 288 and 290, Vol. II, pp. 512 and 980.

Preferably, the crystal is of high quality and preferably quartz. The crystalline structure may be flat or bent depending on the selection of the crystal and the need for bending. Representative dimensions of a crystalline structure are ½ to 10 cm in length, ½ to 10 cm wide and 1/10 to 5/10 cm in thickness with planar spacing being about 1 to 10 Å, advantageously about 1 to 5 Å, and preferably about 1 to 2 Å, for use with the higher energy (the latter values being for photons).

The change and preferably the increase in planar spacing suitably is about 1/10 to 5% and preferably about ½ to 2% along the length of the crystalline face. With the spacing being provided by a temperature differential, a temperature differential of at least about 200° C. up to the crystalline melting point (or Curie point for a beam of neutrons) and advantageously about 200° to 500° C. is desired. A temperature gradient of at least about 50° C./cm up to a value of about 200° C./cm (with the maximum temperature being below the crystalline melting point or Curie point) is desired.

Schematic diagrams have been used in FIGS. 1 to 10 to illustrate characteristics of crystal diffraction of the prior art and those provided by crystalline structures based on the invention. The planar spacing and beams are also enlarged to illustrate the characteristics of the diffraction process.

Figure 1B:
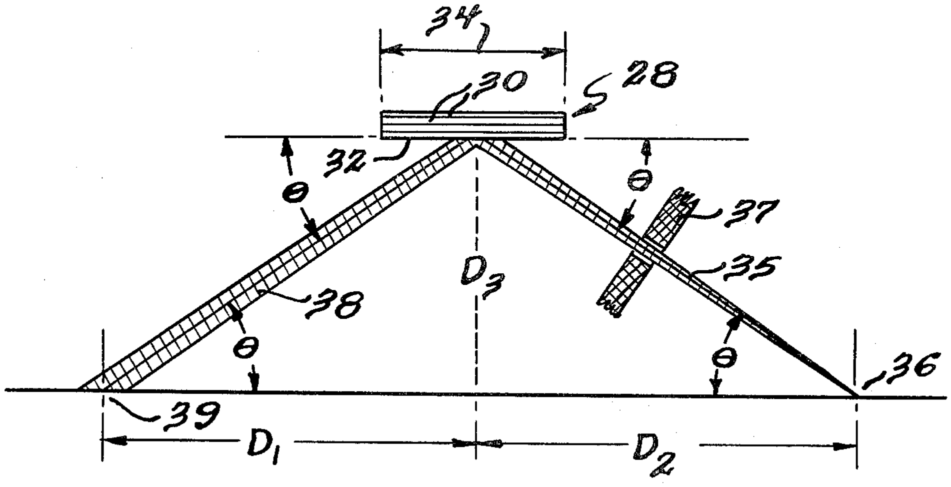
FIG 1B (PRIOR ART)
FIG. 1*b* is a schematic representation of the reflection type of crystal diffraction of the prior art with a flat crystal and a point or line source.
Figure 2A:
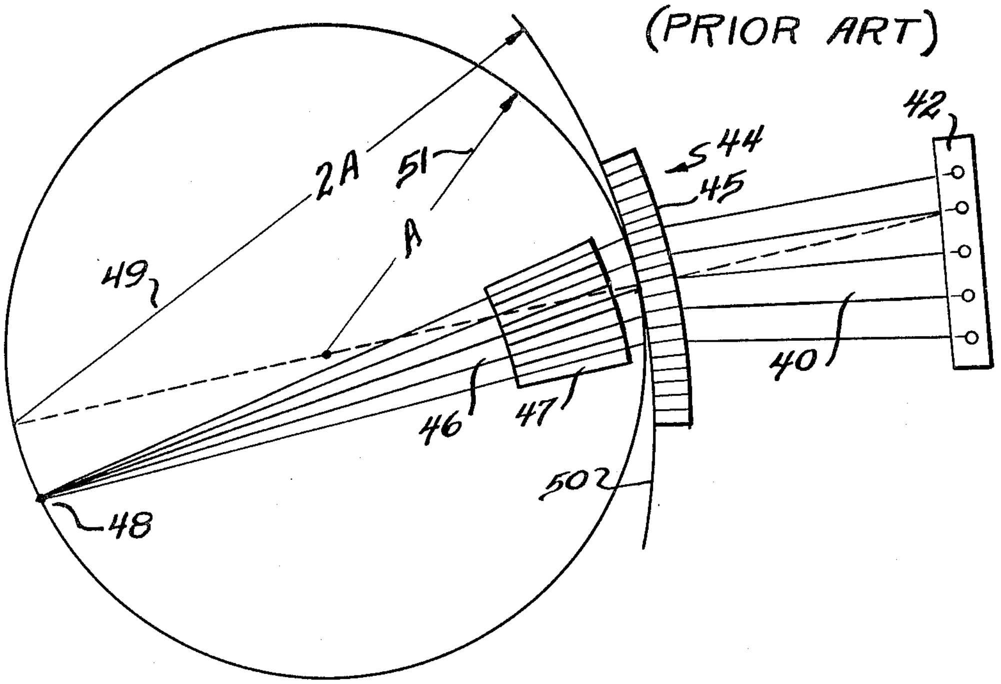
FIG 2A (PRIOR ART)
FIG. 2*a* is a schematic representation of the transmission type of crystal diffraction of the prior art where the crystal is bent and the beam is provided by a broad source.
Figure 2B:
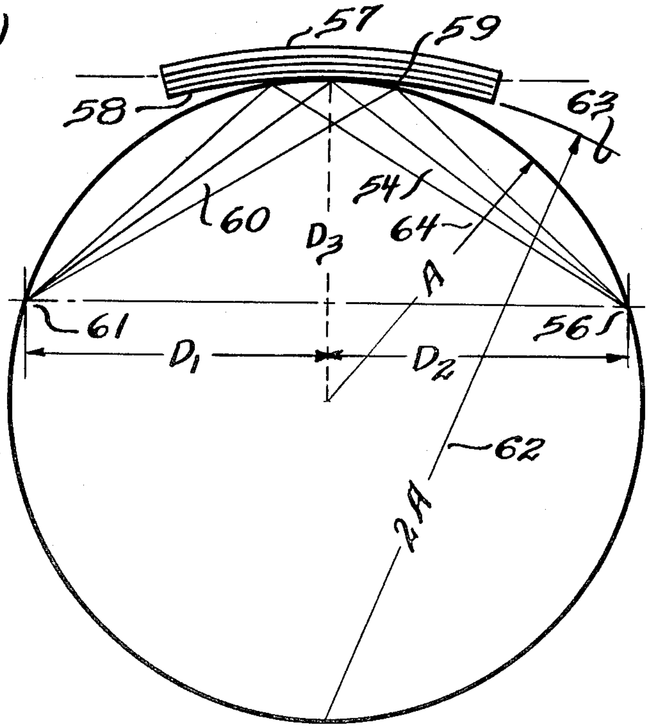
FIG 2B (PRIOR ART)
FIG. 2*b* is a schematic representation of the reflection type of crystal diffraction of the prior art where the crystal is bent and the beam is provided by a point source.

FIGS. 1 and 2 illustrate crystal diffraction based on the prior art. In FIGS. 1*a* and 2*a*, the transmission type of crystal diffraction is illustrated while in FIGS. 1*b* and 2*b*, the reflection type is illustrated. For simplicity, the reflection type is shown with the beam being reflected from the face of the structure although the diffraction uses one or more layers of planar spacing. FIGS. 1*a* and 1*b* illustrate the use of flat crystals while FIGS. 2*a* and 2*b* illustrate the use of bent crystals. As illustrated in FIG. 1*a*, a beam from a point or line source 10 is transmitted through collimator 12 for selection of a beam 14 of narrow width further identified by acceptance angle $\Delta\theta$, and to flat crystal 15 with face 16 having a length 17. The planar spacing 18 of crystal 15 is essentially the same along length 17 and therefore only a limited area 20 or acceptance angle is capable of diffracting the monchromatic portion of the beam under conditions which satisfy the Bragg condition. The angle $\theta$ in FIG. 1*a* represents the Bragg angle. The diffracted beam 21 is directed to form a line image 22. As illustrated, beam 21 diverges slightly so that line image 22 is not a focused image, and the distance $D_1$ and $D_2$ are equal from the center line $D_3$.

In FIG. 1*b*, the planar spacing 30 of crystal 28 extends parallel to face 32 along length 34. As illustrated, beam 35 is directed from point or line source 36, through collimator 37 to face 32, and is diffracted to form diffracted beam 38 which then forms line image 39. Beam 38 diverges slightly so that line image 39 is not focused. Distances $D_1$ and $D_2$ are shown as equal distance from center line $D_3$.

A bent crystal used for the transmission type of crystal diffraction is illustrated in FIG. 2*a* with a beam 40 being directed from the broad source 42 to face 45 of crystal 44. The diffracted beam 46 is directed through collimator 47 to form line image 48. As illustrated, the radius 49 of the arc 50 at which crystal 44 is bent is approximately twice the value for the radius 51 of the focal circle.

In FIG. 2*b*, the reflection type of crystal diffraction with a bent crystal is illustrated. Beam 54 from point source 56 is directed to face 58 of crystal 57 and diffracted by planar spacing 59 to form diffracted beam 60 forming line image 61. As illustrated, distances $D_1$ and $D_2$ are equal distance from center line $D_3$ and the radius 62 of arc 63 for the bent crystal is approximately twice the radius 65 of the focal circle.

Figure 3:
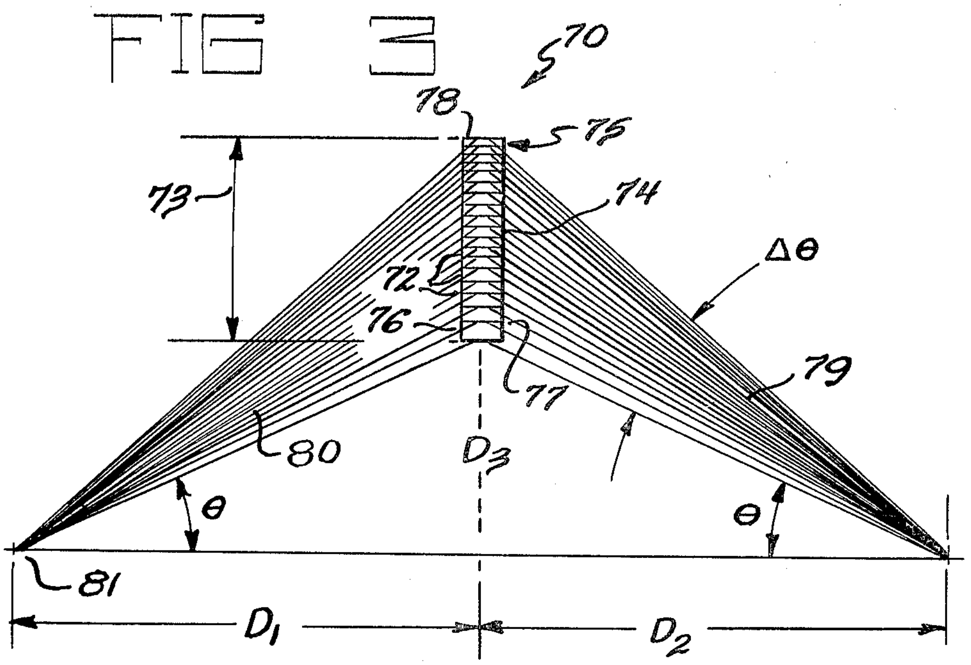
FIG. 3 is a schematic representation of one embodiment of the invention utilizing the transmission type of crystal diffraction with a flat crystal for focusing a beam from a point or line source.

One embodiment of the invention is illustrated in FIG. 3. Flat crystal 70 is used for the transmission type of crystal diffraction and has planar spacing 72 increasing in value along a length 73 of face 74 from a cold end 75 to a hot end 76 with the atomic planes separating the spacing 72 extending across the thickness of the crystal. Since hot end 76 would provide an increase in planar spacing 72; the hot end 76 is located to provide a smaller Bragg angle 77 than angle 78 at the cold end 75. As illustrated, beam 79 is directed to face 74, and is diffracted to form diffracted beam 80 which converges to form a focused line image 81.

Figure 4:
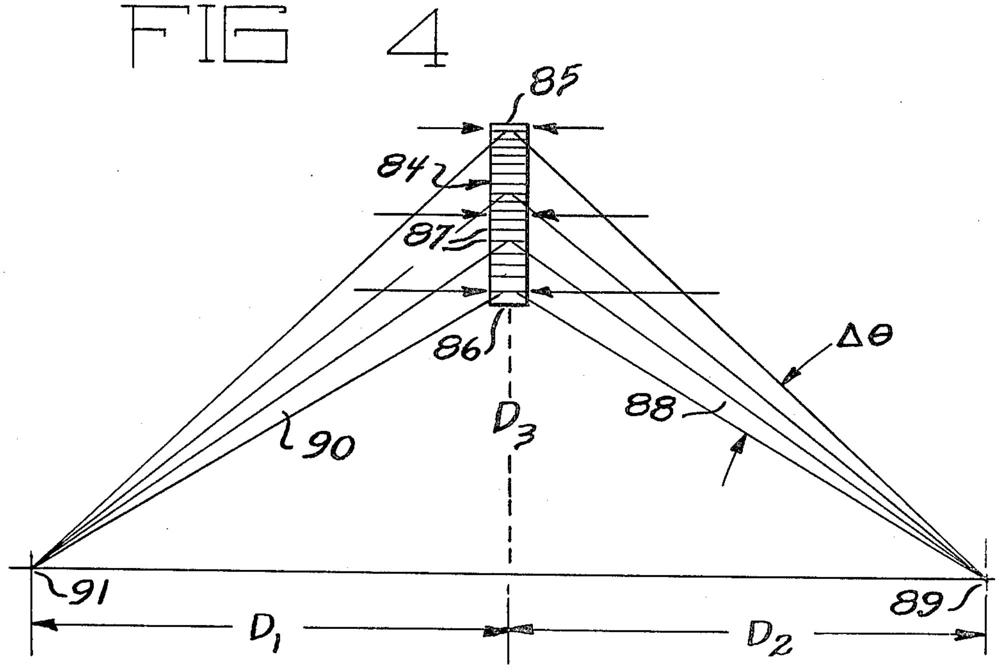
FIG. 4 is a second embodiment of the invention showing a flat crystal of a differing concentration along its length used in the transmission type of crystal diffraction.

In the second embodiment of the invention as illustrated in FIG. 4, a crystalline structure 84 of a material such as nickel is illustrated with an added ingredient such as tin being present in a varied concentration along the length of the crystalline structure to vary the planar spacing. The concentration of tin is varied from a value of about zero percent at end 85 to a value of about 10 at. % at end 86 resulting in the planar spacing 87 varying from a value for "d" of about 3.5172 Å (at a temperature of about 16° C.) at end 85 to about 3.6000 Å (at a temperature of about 16° C.) at end 86. In the crystal diffraction process for the embodiment of FIG. 4, beam 88 from point or line source 89 is directed to a crystalline structure 84 and diffracted by planes 87 to form a diffracted beam 90 which converges to form a focused line image 91. As illustrated, distances $D_1$ and $D_2$ are equidistant from the center line $D_3$.

Figure 5:
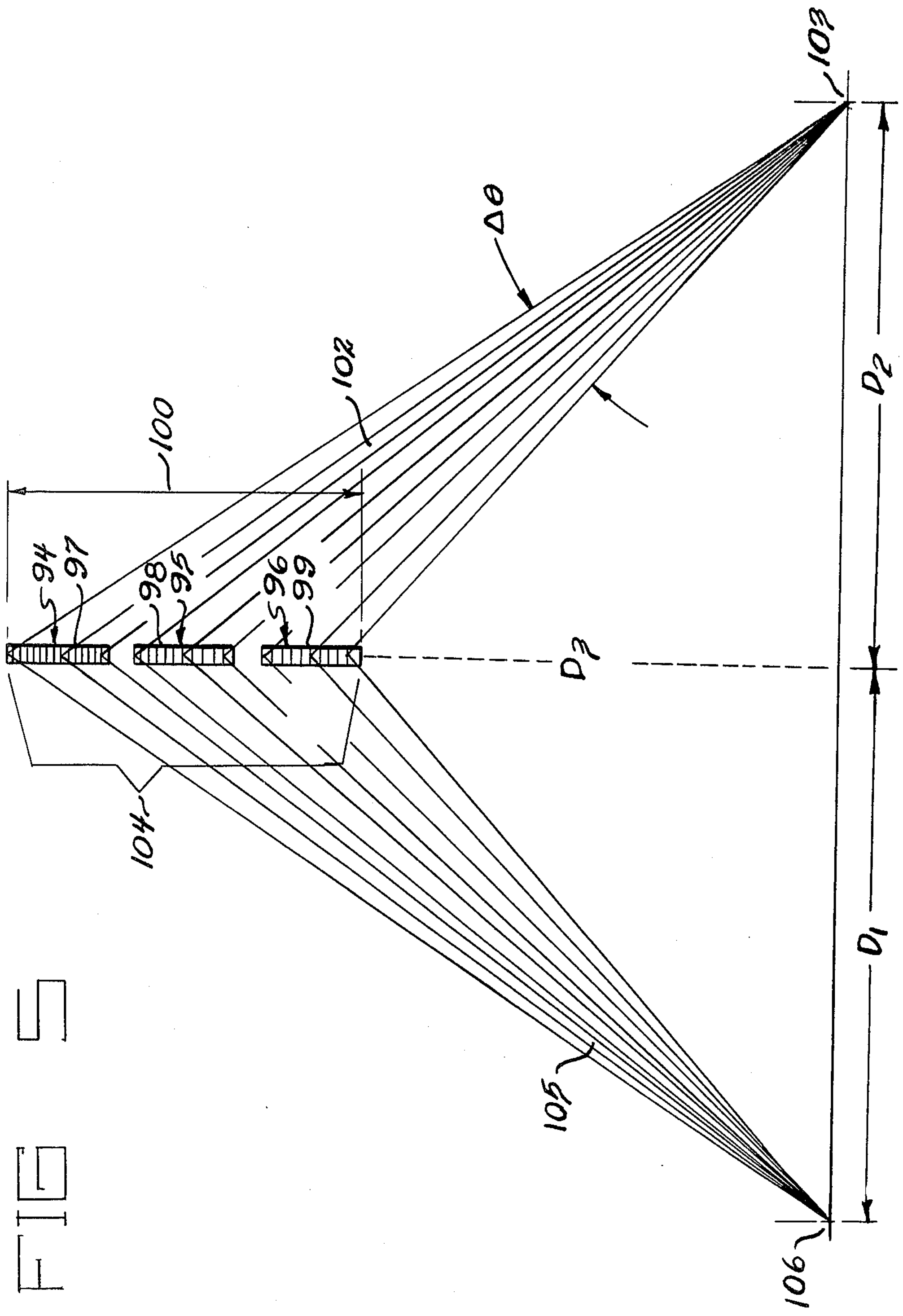
FIG. 5 is a third embodiment of the invention showing a spatial arrangement of three crystals with differing planar spacing used for the transmission type of crystal diffraction.

A spatial arrangement of three different crystals 94, 95 and 96, is illustrated as a third embodiment of the invention in FIG. 5. As illustrated, each of the crystals has opposite cold and hot ends so that the planar spacing varies along the length of the crystal. In addition, the composition of the different crystals varies so that the planar spacing at the cold end is different for each crystal. For purposes of illustration, crystal 94 may be relatively pure nickel with a planar spacing of about 3.5172 Å at the cold end with a temperature of about 16° C., with crystal 95 being nickel containing about 3 at. % Sn having a planar spacing of about 3.5429 Å at the cold end with a temperature of about 16° C., and crystal 96 being nickel containing about 6 at. % Sn having a planar spacing of about 3.5687 Å at the cold end with a temperature of about 16° C. The combination of faces 97, 98, and 99 form an overall length 100 over which the planar spacing is varied to provide an increase in spacing along length 100. A temperature gradient ($\Delta t$/cm) for crystals 94, 95 and 96 (each of one cm in length) is in the respective order of about 176° C. (192° C.−16° C.), 177° C. (193° C.−16° C.), and 178° C. (194° C.−16° C.). Crystals 94, 95 and 96 are separated a slight distance (about 2 cm) by barriers providing insulation between the adjacent ends. The acceptance angle is approximately 540 arc seconds (for a 50 KeV monochromatic beam using the 100 planes of nickel and a fifth order diffraction). In the diffraction process, beam 102 from point or line source 103 is directed to the combination 102 of crystals 94, 95 and 96 and diffracted to form a diffracted beam 105 which converges to form a focused line image 106. Distances $D_1$ and $D_2$ are equidistant from center line $D_3$.

Figure 6:
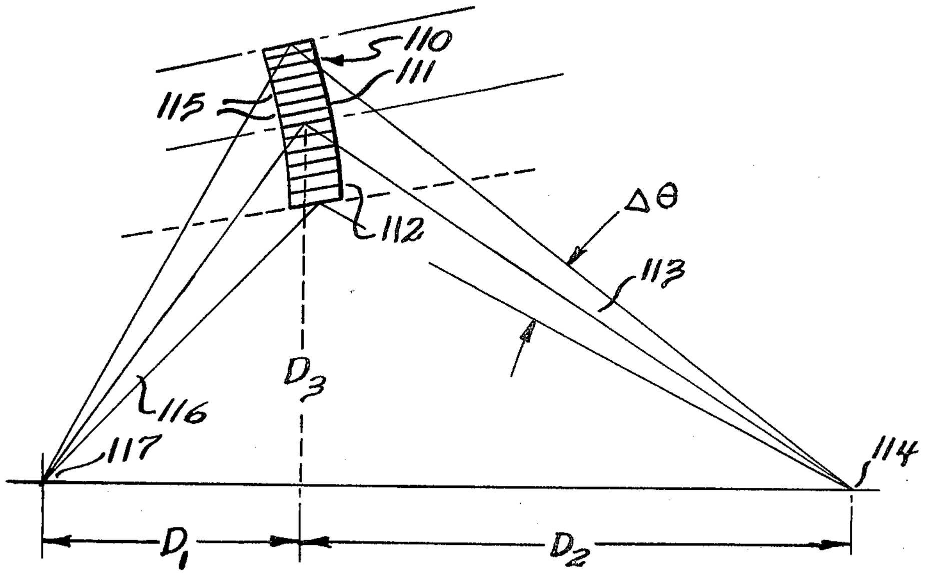
FIG. 6 is a schematic representation of a fourth embodiment of the invention showing a transmission type of crystal diffraction where the crystal is bent and the beam is provided by a point source.

In the fourth embodiment of the invention showing a transmission type of crystal diffraction as illustrated in FIG. 6, a crystalline structure 110 of a material such as quartz is bent so that face 111 is in convex shape along length 112. A temperature gradient is applied over length 112 to provide a variation in the planar spacing along length 112. This will provide a change in the Bragg angle based on the preceding equations for the radius of curvature ($R_c$) and the desired $\Delta d/d$ based on the further relationship that $\Delta d/d = \alpha\Delta t$ where "$\alpha$" equals the coefficient of thermal expansion and "$\Delta t$" equals the temperature differential. Beam 113 from point or line source 114 is directed to face 111 over which the planar spacing 115 is varied and becomes diffracted to form a diffracted beam 116. Line image 117 is formed by the converging beam 116. In FIG. 8, distances $D_1$ and $D_2$ are at unequal distances from center line $D_3$.

Figure 7:
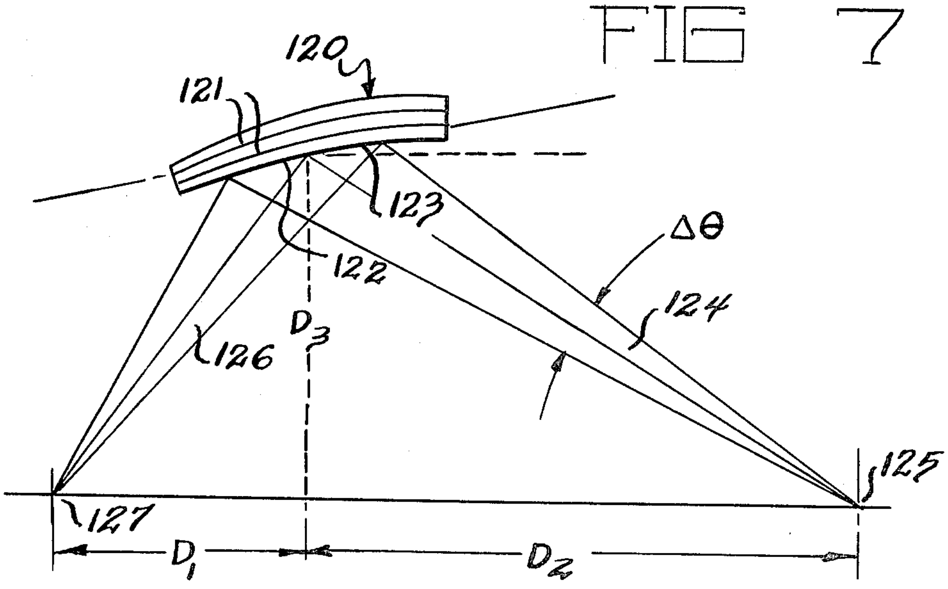
FIG. 7 is a fifth embodiment of the invention showing a reflection type of crystal diffraction where the crystal is bent and the beam is provided by a point source.

FIG. 7 illustrates the reflection type crystal diffraction with crystalline structure 120 being bent so that the incident angle or Bragg angle varies along length 123 of face 122 with the atomic planes separating the spacing extending in a direction parallel to face 122. As illustrated, a temperature gradient is applied over the length 123 to provide the variation in planar spacing that matches the variation in Bragg angle. In the diffraction process, beam 124 from point or line source 125 is directed to face 122 and becomes diffracted to form diffracted beam 126. The convergence of beam 126 forms line image 127. As illustrated, distances $D_1$ and $D_2$ are unequal with respect to center line $D_3$.

In FIGS. 8 and 9, crystalline structures 130 and 150 are used as means to diffract and focus parallel beams 132 and 152, respectively, as in an instrument of the type used for a satellite telescope. In FIG. 10, the temperature gradient is applied across length 134 of face 133 of crystalline structure 130 to provide a variation in planar spacing. Beam 132 is directed to face 133 and is diffracted to form diffracted beam 135 which converges to form focused line image 136. In a similar manner, although utilizing the reflection type of crystal diffraction, beam 152 is directed to face 153 of crystalline structure 150 and is diffracted to form diffracted beam 155 which converges to form focused line image 156. As illustrated, a temperature gradient is applied across length 154 of face 153 to provide a variation in planar spacing.

In FIG. 10, a plurality of crystalline structures are utilized to form a focused point image from a point source. As illustrated, crystalline structure 160 has a temperature differential applied along the length 163 of face 162 to provide a variation in planar spacing. As illustrated, face 162 has a concave shape exposed to point source 164. Beam 165 is directed to face 162 and forms a diffracted beam 166 which converges to form line image 167. Crystalline structure 168 is placed in the path of diffracted beam 166 and forms a second diffracted beam 169 which converges to form point image 170. Crystalline structure 168 also has a temperature differential applied along length 172 of face 171 to provide a variation in planar spacing.

Figure 11:
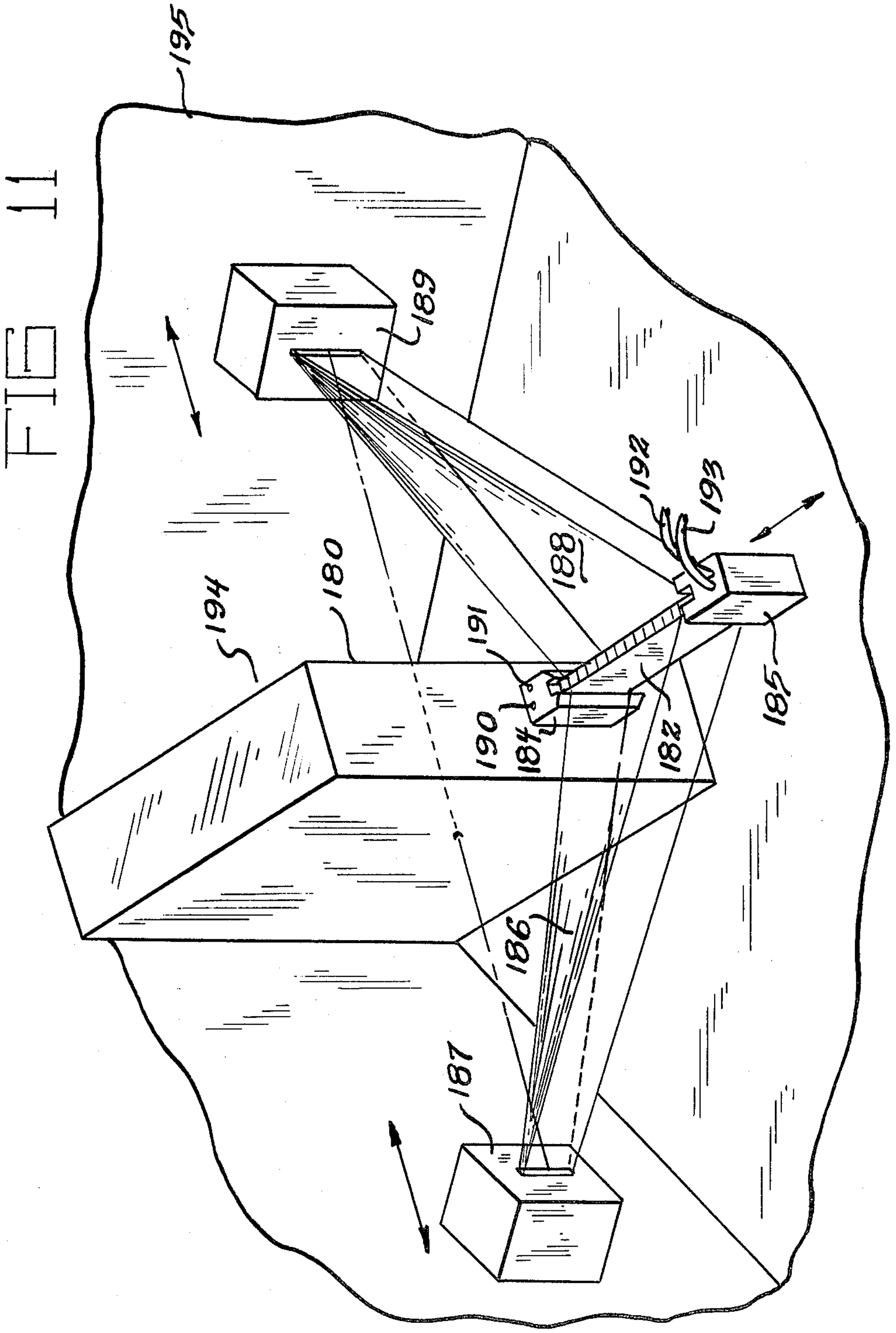
FIG. 11 is a pictorial representation of an instrument utilizing the invention and providing means for creating a temperature differential across the crystal.

In the pictorial representation of instrument 180 as illustrated in FIG. 11, a flat crystal 182 is held between brackets 184 and 185 and used to diffract a beam 186 of energy of approximately 50 KeV from source 187. The diffracted beam 188 is transmitted to detector slit 189. The temperature gradient of about 300° C. is applied by the use of electrical heating in bracket 184 as illustrated by wires 190 and 191, and by cooling in bracket 185 as illustrated in tubes 192 and 193. Shield 194 provides protection for the detector 189 against the radiation from the source. Source 187 and detector slip 189 may be movable to adjust to different photon energies, different temperature differentials, and different Bragg angles. An enclosure 195 is also provided so that the diffraction process is carried out in a vacuum.

As described above, the invention provides a valuable instrument for crystal diffraction by providing a crystalline structure with varied planar spacing along the face receiving the beam for diffraction. The planar spacing may be varied by use of a temperature gradient, by the use of different crystalline structures aligned along a length with each structure of a different composition, by the use of a crystalline structure with a varied composition along its face, and by combinations of these techniques. Crystalline structures with different compositions and with different planar spacing are shown in "A Handbook of Lattice Spacings and Structures of Metals and Alloys" by W. B. Pearson, Pergamon Press, London (1958 and 1967), Vol. I, pp. 286, 288 and 290, Vol. II, pp. 512 and 980. A crystalline structure with a change in composition along its face may formed by zone refining where the composition at one end is enriched with a second component which is then distributed along the length of the crystalline structure during the zone refining process.

Figure 12A:
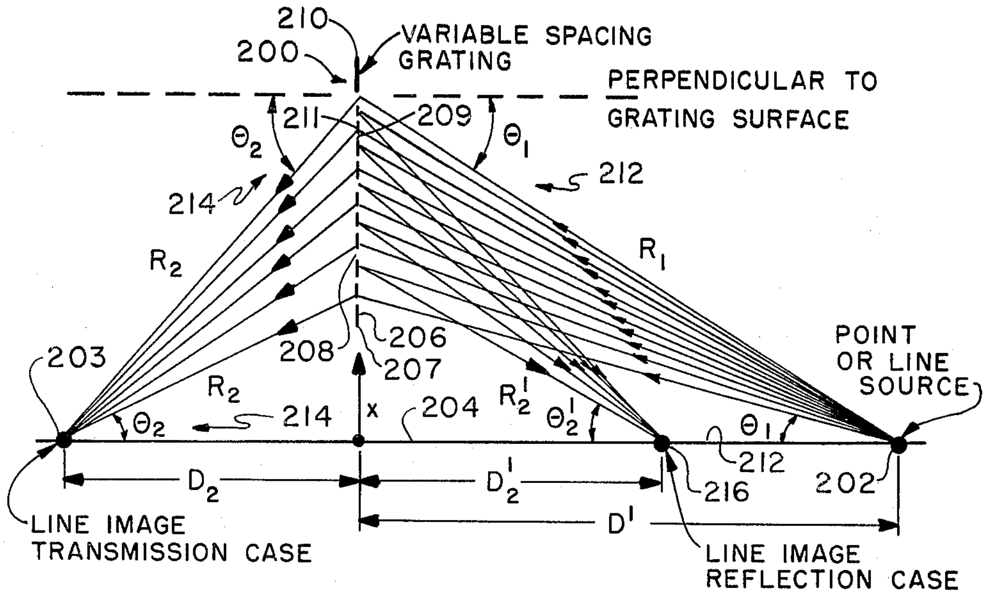
FIG. 12*a* is a schematic representation of the transmission type and reflection type of diffraction (first type) by gratings with varied spacings and which utilizes the invention for the focusing of a point or line source to a line image.

As illustrated in FIG. 12*a*, a diffraction grating 200 is positioned perpendicular to a line 204 connecting the point source 202 to the line image 203 and provides focusing of the point source. Grating 200 includes surface 206 with face 207 having diffraction spacing 208 extending along the length 210 of face 207 with the spacing increasing in the direction of line 204. The Bragg angles $\theta_1$ and $\theta_2$ are identified by numbers 212 and 214. In the transmission mode, the image 203 is on the opposite side of grating 200 while in the reflection mode, the image 216 is on the same side. As illustrated, it is not necessary that distance $D_1$ equals distance $D_2$. The diffraction elements may be represented by the open spaces 209 between the dark line segments 211 in the transmission mode or by the dark line segments 211 in the reflection mode.

Figure 12B:
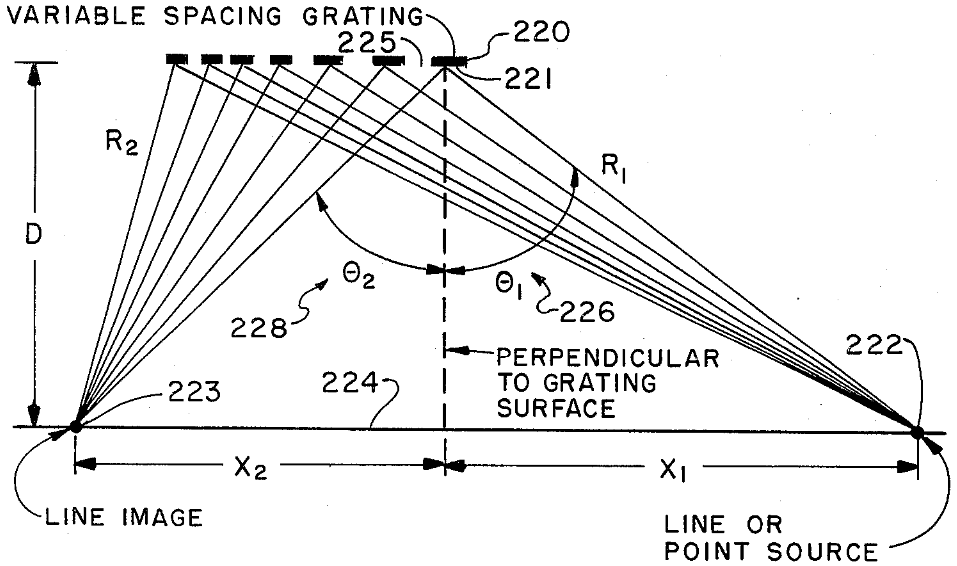
FIG. 12*b* is a schematic representation of an alternate or second kind of geometry for the reflection type of diffraction by gratings with varied spacings which utilizes the invention for the focusing of a point or line source to a line image.

In FIG. 12*b*, grating 220 is positioned parallel to line 224 connecting point source 222 and line image 223 and provides focusing of a monochromatic portion of the point source. The Bragg angles $\theta_1$ and $\theta_2$ are represented by numbers 226 and 228. As illustrated, it is not necessary that $X_1$ equal $X_2$. In the reflection mode, the diffraction elements are represented by the dark line segments 221 separated by spacing 225.

Figure 13A:
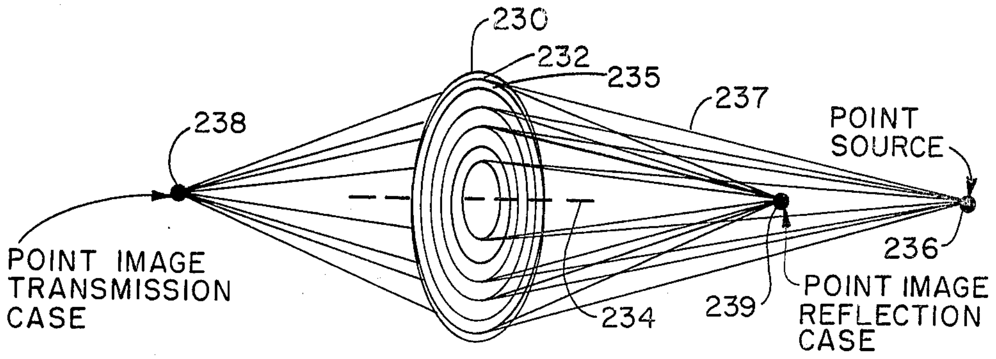
FIG. 13*a* is a schematic representation of a transmission type and reflection type (of the first type) of diffraction showing the focusing characteristics of a circular grating as an embodiment of this invention for the case of a point source focused to a point image.

In FIG. 13*a*, the diffraction grating 230 includes the diffraction elements arranged in circles 232 with a common axis 234 with the separations 235 between circles 232 representing the spacing between the elements in the transmission mode. As illustrated, grating 230 may be used to focus the rays 237 of a point source 236 along two dimensions to form point image 238 from the transmission mode and point image 239 in the reflection mode.

Figure 13B:
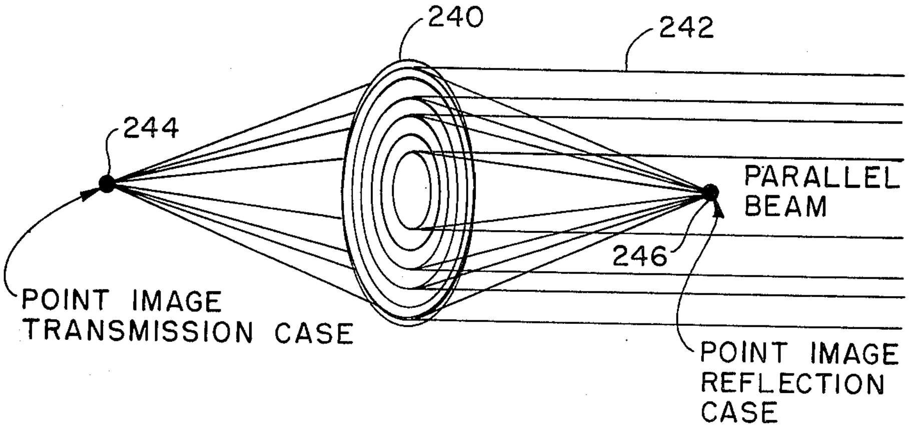
FIG. 13*b* is a schematic representation of a transmission type and reflection type of diffraction showing the focusing characteristics of a circular grating for a parallel beam source focused to a point image.

In FIG. 13*b*, diffraction grating 240, similar to grating 230 in FIG. 13*a*, is used to focus parallel beam 242 to form point image 244 in the transmission mode and point image 246 in the reflection mode.

Figure 14:
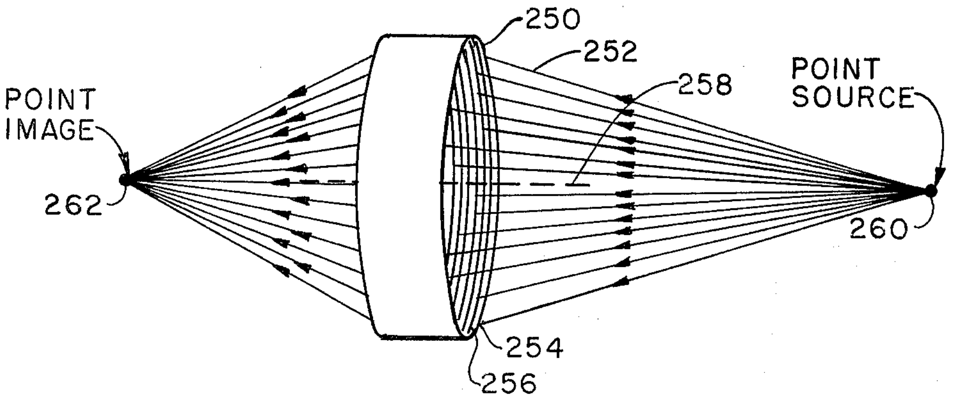
FIG. 14 is a schematic representation of a grating curved in a ring-like structure for focusing and diverging rays of a point source to a point image.

As illustrated in FIG. 14, diffraction grating 250 is in a ring-like shape 252 formed by bending a flat structure. Diffraction elements 254 extend in circles 256 with a common axis 258 with ring 252 to focus point source 260 to form point image 262.

Figure 15:
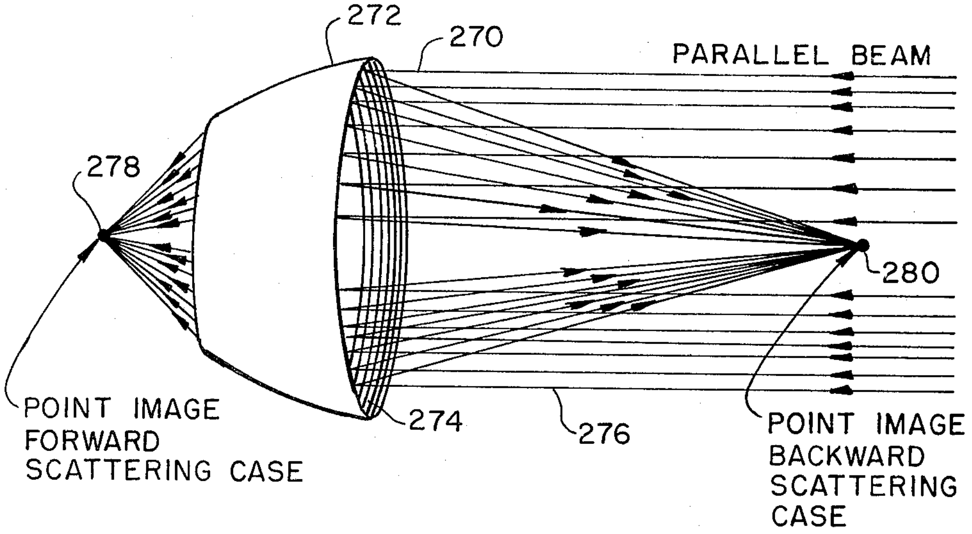
FIG. 15 is a schematic representation of a grating curved to form a hollow conical section for focusing parallel rays to a point image.

In FIG. 15, grating 270 is in the form of a hollow conical section 272 having a tapered surface 274 to focus parallel beam 276 to form point image 278 in the normal reflection mode and point image 280 in the backward scattering reflection mode.

Diffraction gratings of the invention having spaced diffraction elements with the separations increasing or decreasing along a length, provide a useful means for diffracting beams of energy. Since these gratings may be easily manufactured and shaped in a variety of forms, the resultant gratings provide a relatively low cost source of lens and other diffraction system for focusing or otherwise directing beams of energy. Further, they provide a means of selecting a monochromatic portion of a beam with mixed wavelengths and diffracting the monochromatic portion to form an image apart from other images.

The embodiments of the invention in which an exclusive property or privilege is claimed are defined as follows:

1. A crystal diffraction instrument comprising means for diffracting a beam having an energy of above about 5 KeV, including a crystalline structure with a surface having a face for receiving the beam and atomic planar spacing along the face for diffracting the beam, the spacing changing progressively along a direction parallel to said face to provide Bragg angles of progressively changing values to increase the usable area of said face for diffraction and to provide a focusing of said beam.

2. The instrument of claim 1 wherein the instrument includes means for admitting a beam from a source and means for detecting the diffracted and focused beam.

3. The instrument of claim 2 wherein said means for diffracting the beam includes means for focusing a parallel beam.

4. The instrument of claim 1 wherein said instrument means for applying a temperature gradient across said crystalline structure in a direction parallel to said face, said gradient being sufficient to provide said progressive change in the range of about 0.1 %–5.0% in said spacing.

5. The instrument of claim 1 wherein said crystalline structure is composed of a differing composition across said structure in a direction parallel to said face to provide said progressive change in said spacing.

6. The instrument of claim 1 wherein said crystalline structure comprises a plurality of separate structures arranged to form said face, each structure having a different composition with a different atomic planar spacing to provide said progressive change in said spacing.

7. The instrument of claim 4 wherein said crystalline structure is composed of a differing composition along said face.

8. The instrument of claim 4 wherein said temperature gradient is at least 50° C./cm.

9. The instrument of claim 1 wherein said structure has a thickness and the atomic planes separating said spacings extend across said thickness for transmission type diffraction of said beam.

10. The instrument of claim 9 wherein said face is in a convex shape.

11. The instrument of claim 9 wherein said instrument includes means for admitting a beam from a source and means for detecting the diffracted and focused beam.

12. The instrument of claim 11 wherein said instrument includes means for applying a temperature gradient across said crystalline structure in a direction parallel to said face, said gradient being sufficient to provide said progressive change in the range of about 0.1%–5.0% in said spacing.

13. The instrument of claim 11 wherein said crystalline structure is composed of a differing composition across said structure in a direction parallel to said face to provide said progressive change in said spacing.

14. The instrument of claim 1 wherein the atomic planes separating said spacings extend in a direction parallel to said face for reflection type diffraction of said beam.

15. The instrument of claim 14 wherein said face is in a concave shape.

16. The instrument of claim 14 wherein the instrument includes means for admitting a beam from a source and means for detecting the diffracted and focused beam with said face being in a concave shape and of unequal distances from said source and detecting means.

17. The instrument of claim 16 wherein said instrument includes means for applying a temperature gradient across said crystalline structure in a direction parallel to said face, said gradient being sufficient to provide said progressive change in the range of about 0.1%–5.0% in said spacing.

18. The instrument of claim 16 wherein said crystalline structure is composed of a differing composition across said structure in a direction parallel to said face to provide said progressive change in said spacing.

19. A method of conducting crystal diffraction with respect to a beam of having an energy above about 5 KeV, comprising the steps of (1) providing a crystalline structure having a face for receiving the beam and atomic planar spacing along said length with the spacing progressively changing across said structure in a direction parallel to said face to progressively change the corresponding Bragg angles and provide a focusing of said beam, (2) directing said beam to said periodic structure to provide a diffracted and focused beam, and (3) detecting the diffracted beam at a focusing position.

20. The method of claim 19 wherein the step of providing the crystalline structure includes the step of progressively changing the spacing without substantially increasing mechanical stresses in said structure.

21. The method of claim 20 wherein the step of providing the crystalline structure includes the step of applying a temperature gradient across the structure in a direction parallel to said face, said gradient being sufficient to provide said progressive change in the range of about 0.1%–5.0%.

22. The method of claim 21 wherein said temperature gradient is at least 50° C./cm.

23. The method of claim 21 including the step of changing the atomic planar spacing in said crystalline structure to change the selection of energies of a beam for diffraction.

* * * * *